Sept. 22, 1942.                E. R. WOLFERT                2,296,822
                          AIR CONDITIONING APPARATUS
                      Filed April 23, 1938        2 Sheets-Sheet 2
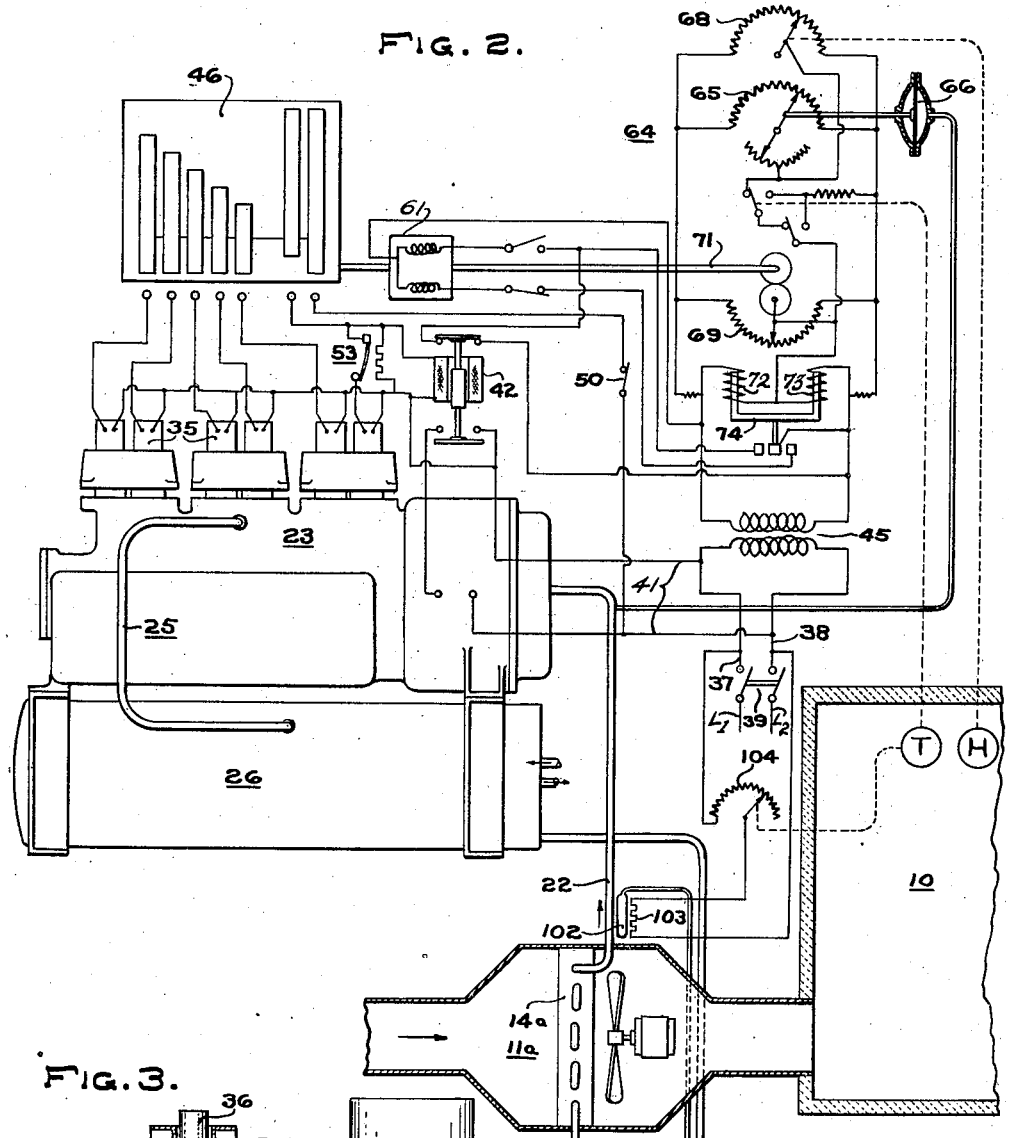
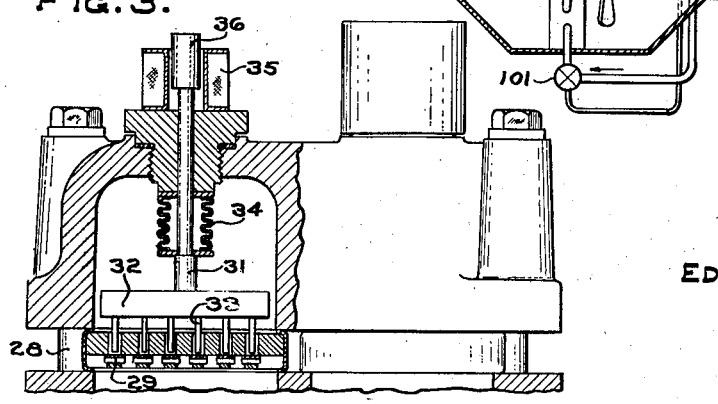
INVENTOR
EDWARD R. WOLFERT.
BY
ATTORNEY Patented Sept. 22, 1942

2,296,822

UNITED STATES PATENT OFFICE 2,296,822

AIR CONDITIONING APPARATUS

Edward R. Wolfert, Springfield, Mass., assignor to Westinghouse Electric & Manufacturing Company, East Pittsburgh, Pa., a corporation of Pennsylvania Application April 23, 1938, Serial No. 203,797

15 Claims. (Cl. 62—4)

My invention relates to air conditioning apparatus, more particularly to air conditioning apparatus including a mechanical compressor and an evaporator for cooling and dehumidifying air for an enclosure, and it has for an object to provide improved apparatus of the character set forth.

Another object is to provide apparatus wherein the rate of cooling or sensible heat removal from the air and the rate of dehumification or latent heat removal may be independently regulated, as far as possible.

A more particular object is to obtain, concurrently with the aforementioned regulation, reduction in power load of the compressor when the cooling load on the apparatus is reduced by such regulation.

In accordance with my invention, I provide a multi-cylinder compressor having unloader mechanisms for at least some of the cylinders whereby the capacity or output of the compressor may be varied. I further provide means for actuating the unloader mechanisms to maintain a predetermined suction pressure. The action of this control means is modified or compensated in response to the humidity of the air in the enclosure to be air conditioned. As the humidity increases, the suction pressure is reduced in order to effect a greater degree of dehumification of the air and as the humidity decreases, the suction pressure is increased to provide a lesser degree of dehumidification. The rate of sensible or dry bulb temperature reduction of the air is also regulated. This may be done, for example, by regulating the rate of admission of liquid refrigerant to the evaporator, or it may be done by by-passing air around the evaporator, in either case, in response to the dry bulb temperature of the air in the enclosure.

The above recited and other objects are effected by my invention as will be apparent from the following description and claims taken in connection with the accompanying drawings, forming a part of this application, in which:

Fig. 2 is a similar diagrammatic view of a second embodiment; and

Fig. 3 is a detail view, partly in section, of the unloader mechanism for one of the cylinders.

Figure 1:
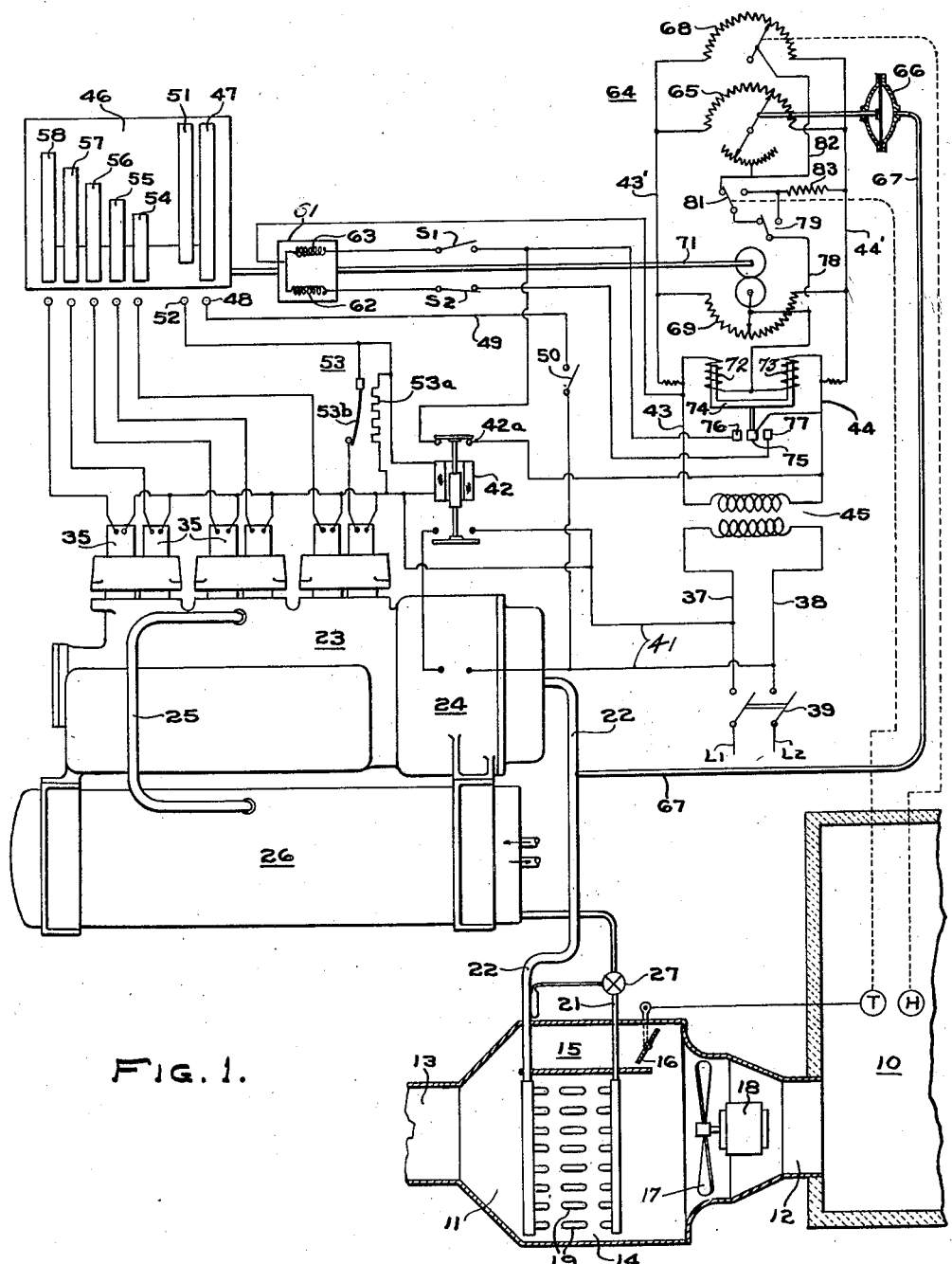
Fig. 1 is a diagrammatic view of one embodiment of my invention.

Referring to the drawings in detail, the enclosure to be air conditioned is indicated at 10. A chamber 11 contains the air conditioning elements and is connected to the enclosure 10 through a duct 12. Air to be conditioned and delivered to the enclosure, which may obviously be either outdoor air, return room air, or a mixture of both, is conveyed to the chamber through a duct 13.

Fig. 1 shows an evaporator 14 disposed within the chamber 11, inasmuch as the present invention relates to the cooling and dehumidifying apparatus, but it is to be understood that other air treating elements may be contained therein. There is also a by-pass passage 15, controlled by a damper 16, as shown in Fig. 1. A fan 17, driven by a motor 18, is provided to effect flow of air through the duct 13, through the chamber 11, in which it passes over the evaporator 14 and through the by-pass passage 15 in parallel, and through the duct 12 to the enclosure 10. The evaporator 14 comprises a plurality of coils 19 arranged in parallel with respect to air flow. The coils are supplied with liquid refrigerant from a liquid supply conduit 21 and discharge the vaporized refrigerant to a suction conduit 22. Suitable provision is made for distributing liquid refrigerant to the coils in equal proportions, but since such provision is already known and specifically forms no part of the present invention, it is not necessary to further describe the same herein.

The refrigerating system further includes a compressor 23 which is shown as comprising six cylinders and driven by a motor 24. The compressor and the motor are enclosed in a common gas-tight casing which is formed so that the vaporized refrigerant from the suction conduit 22 passes through the motor containing portion of the casing in flowing to the several cylinders. The compressed refrigerant is conveyed through a discharge conduit 25 to a condenser 26, from which the condensed refrigerant is admitted to the liquid supply conduit 21. The flow of refrigerant to the evaporator is controlled by a suitable expansion valve 27, which is preferably a thermostatic expansion valve regulating the flow of refrigerant so as to maintain a substantially constant degree of superheat of the refrigerant leaving the evaporator, as is well known in the art.

The several cylinders are provided with unloader mechanisms, such as shown in Fig. 3, which effect unloading by holding the suction valves open. The suction valves are pressure operated and in the form shown in Fig. 3 comprise a valve cage 28 containing reed or feather valves 29 and clamped between the cylinder and the cylinder head. The unloader mechanism includes a rod 31 extending through the top wall of the cylinder head, a bar 32 carried by the lower end of the rod 31, and a plurality of fingers 33 depending from the bar 32 and adapted upon downward movement to engage the valve reeds 29 and hold them in open position. The opening in the cylinder head through which the rod extends is sealed by a bellows 34 which bellows also exerts a spring effect to hold the rod 31 upwardly in retracted position. A solenoid 35, including a core 36 attached to the upper end of the rod 31, is adapted when energized to move the rod 31 downwardly for unloading the cylinder.

Electric current at suitable voltage is supplied from line conductors L1 and L2 to conductors 37 and 38 through an entrance switch 39. The motor circuit 41, controlled by a relay 42 supplies current from the conductors 37 and 38 to the motor 24. Electric current at reduced voltage suitable for control purposes is supplied to conductors 43 and 44 by a transformer 45, the primary of which is connected to the conductors on 37 and 38.

The solenoids of the several unloader mechanisms are controlled by a controller drum 46, shown projected on the drawings. The drum has a contact segment 47 adapted to engage a stationary contact 48 throughout the movement of the drum. The contact 48 is connected to the conductor 38 through a conductor 49 provided with a switch 50. The drum also has a contact segment 51 which is adapted to engage a stationary contact 52 in all positions except the forward or off position. The contact segment 51 and the stationary contact 52 control the motor relay 42 and also the unloader solenoid 35 of the sixth cylinder. A time delay relay 53 is adapted to deenergize said solenoid to load said cylinder after the relay 42 has been energized a predetermined period of time, such as two or three seconds. The purpose of the time delay is to maintain the cylinder unloaded during starting of the compressor. The relay 53 includes a heating element 53a, which is energized simultaneously with the relay 42, and a thermostatic switch 53b adapted to be opened in response to the heat from the element 53a. The drum 46 is further provided with contact segments 54 to 58, which control the solenoids of the remaining unloader mechanisms. These contact segments engage their respective stationary contacts in the off position of the drum and successively disengage the same as the drum moves in forward direction to a sufficient extent.

The drum 46 is actuated by a reversible motor 61 having a forward winding 62 and a reversing winding 63, and provided with limit switches S1 and S2, which terminate operation of the motor 61 when the drum reaches the end of its travel in either direction, as is fully understood and commonly practiced in the art. Suitable provision is made for returning the drum 46 to the off position in the event that the compressor is shut down by opening the switch 50. This may be effected in any suitable manner, for example, the relay 42 may be provided with back contacts 42a arranged to energize the reversing winding 63 when the relay 42 is deenergized.

The motor 61 is controlled by a potentiometer control 64. The latter includes conductors 43' and 44', which are connected to the conductor 43 and 44, respectively, through protective resistances. The potentiometer control further includes a controller potentiometer 65, which is connected between the conductors 43' and 44' and actuated by a pressure responsive device 66. The latter is connected by a tube 67 to the suction conduit 22, so that the potentiometer 65 is controlled in response to the suction pressure. The control further includes a compensating potentiometer 68, also connected between the conductors 43' and 44' and actuated by a humidostat H disposed in the enclosure 10 or otherwise subjected to the humidity of the air therein. A balancing potentiometer 69 is similarly connected and is actuated by the reversible motor 61 through a shaft 71.

The potentiometer control further includes balancing coils 72 and 73, which are connected in series between the conductors 43 and 44 and adapted to impose opposing force on an armature 74 which actuates a movable contact 75 connected to the conductor 44. The latter is disposed between contacts 76 and 77 connected to the forward and reversing windings 62 and 63, respectively.

A conductor 78 is connected intermediate the coils 72 and 73 and to the contact arm of the balancing potentiometer 69. It is also connected through a manually actuated switch 79 and a thermostatically controlled switch 81 to a conductor 82, which in turn is connected to the contact arms of the potentiometers 65 and 68. Either of the switches 79 and 81 is adapted to disconnect the conductor 78 from the conductor 82 and to connect the same to the conductor 44' through a resistance 83.

A thermostat T, disposed in the enclosure 10 or otherwise subjected to the temperature of the air therein is adapted to control the by-pass damper 16 in any suitable manner, the drawing representing such control diagrammatically. The control is arranged so that the damper is moved in closing direction as the temperature increases, and vice versa. The thermostat T also controls the switch 81, being adapted to connect the conductor 78 to the resistance 83 when the temperature of the air in the enclosure decreases to the minimum value desired to be maintained therein.

The control of the damper 16 and of the several potentiometers is of the modulating or intermediate type.

Fig. 1.—*Operation*

As the temperature of the air in the enclosure 10 increases, the thermostat T moves the by-pass damper 16 in closing direction to decrease the quantity of air that can by-pass the evaporator 14. Accordingly, a greater portion of the air passing through the chamber 11 is caused to flow over the evaporator to be cooled thereby. Thus, a greater amount of cooling or sensible heat removal for the enclosure 10 is provided. Conversely, upon decrease in temperature, the damper 16 is moved in opening direction to increase the quantity of by-passed air to reduce the quantity of air passing over the evaporator.

The capacity or out-put of the compressor is controlled, through the several unloader mechanisms, to maintain a desired or given suction pressure. In the present embodiment, the suction pressure, which determines the temperature of the evaporator, is varied in response to the humidity of the air in the enclosure. As the humidity increases, the suction pressure is reduced, so that the air is dehumidified to a greater degree by the lower temperature of the evaporator, and vice versa.

The control of the unloader mechanisms will now be considered more in detail. Referring to the potentiometer control, it is to be understood that in the equilibrium condition, the voltage drop between the conductors 43' and 78 is equal to the voltage drop between the conductors 78 and 44'. Under this condition, the coils 72 and 73 impose equal and opposite forces on the armature 74, so that the contact 75 remains in intermediate position between the contacts 76 and 77.

Upon increase in suction pressure, the pressure responsive element 66 moves the contact arm of the controller potentiometer 65 in counterclockwise direction thereby decreasing the resistance and voltage drop between the conductors 43' and 78 and increasing the resistance and voltage drop between the conductors 78 and 44'. Accordingly, the force of the coil 73 overcomes that of the coil 72 and moves the armature 74 in counterclockwise direction to engage the contacts 75 and 77. The motor 61 is thereby operated in forward direction and moves the contact segment 51 to engage with the stationary contact 52 to energize the relay 42 and start the motor and compressor unit, and also to unload the sixth cylinder, the latter being loaded, however, after an interval of 2 or 3 seconds. As the motor 61 moves the controller 46 in forward direction, it also moves the contact arm of the balancing potentiometer 69 in counterclockwise direction, thereby increasing the resistance between the conductors 43' and 78 and decreasing the resistance between the conductors 78 and 44'. When the drum has been moved to an extent called for by the extent of movement of the potentiometer 65, the action of the potentiometer 69 counter-balances that of the potentiometer 65, and restores balance between the two voltage drops. The coils 72 and 73 are again balanced and actuate the contact 75 to terminate further operation of the motor 61.

In the off position of the drum 46, the contact segments 54 to 58 engage their respective stationary contacts, so that the controlled solenoids are energized. Accordingly, the several unloader mechanisms are held in the lower position, thereby holding the suction valves 29 open. Inasmuch as the refrigerant gas in the cylinders can escape to the suction valve on the upstroke of the piston, the cylinders are unloaded. As the drum moves in forward direction upon increase in suction pressure as described above, after the motor compressor is operating with the sixth cylinder loaded, the contacts 54 to 58 successively disengage the respective stationary contacts to successively load the other cylinders.

As each solenoid is deenergized, the unloader mechanism is moved upwardly by the force of the bellows 34 permitting the suction valves to close and load the cylinder.

Upon decrease in suction pressure, the pressure responsive element 66 moves the contact arm of the potentiometer 65 in clockwise direction thereby increasing the resistance and voltage drop between the conductors 43' and 78 and decreasing the voltage drop and resistance between the conductors 78 and 44'. The force of the coil 72 overcomes that of the coil 73 so that the armature 74 moves the contact 75 to engagement with the contact 76. The motor 61 moves the drum 46 in reverse direction, causing the contact segments 54 to 58 to successively engage the respective stationary contacts and unload the associated cylinders in the reverse order. The drum also moves the contact arm of the potentiometer 69 in clockwise direction to restore balance between the voltage drops and terminate the operation of the motor 61 after the drum has been moved to an extent called for by the decrease in suction pressure.

Assume now that the humidity of the air in the enclosure 10 increases, so that the humidostat H moves the contact arm of the compensating potentiometer 68 in counterclockwise direction. This action decreases the resistance between the conductors 43' and 78 and increases that between the conductors 78 and 44'. The effect of this action is to cause the potentiometer control to maintain a higher suction pressure since the contact arm of the potentiometer 65 must assume a position further clockwise in order to offset the action of the potentiometer 68, and a lower suction pressure is required to maintain such position.

Upon increase in the humidity of the air in the enclosure 10, the humidostat H moves the contact arm of the potentiometer 68 in counterclockwise direction, thereby decreasing the resistance between the conductors 43' and 78 and increasing the resistance between the conductors 78 and 44'. The immediate effect of this action is to increase the capacity of output of the compressor to reduce the suction pressure. The final effect is to reduce the predetermined suction pressure which is maintained by the potentiometer 65, since the contact arm of the latter must maintain a position nearly to the clockwise end of its travel in order to balance the action of the potentiometer 68, which means that a lower suction pressure will be maintained. Upon decrease in humidity, the contact arm of the potentiometer 68 is moved in clockwise direction, in which case the effect is the opposite of that just described.

In Fig. 2, I show a second embodiment of my invention which is very similar to that shown in Fig. 1. The suction pressure is controlled in response to the humidity of the air in the enclosure 10 in the same manner as in Fig. 1. The rate of sensible heat removal from the air, however, is varied by varying the flow of refrigerant to the evaporator, all of the air, or a fixed proportion thereof being conveyed over the evaporator 14—A at all times. The evaporator 14—A is diagrammatically represented as comprising a single coil extending across the air conditioning chamber 11—A, but it is to be understood that any suitable type of evaporator, such as the evaporator 14 of Fig. 1, may be used.

The admission of refrigerant to the evaporator is regulated by a thermostatic expansion valve 101 in response to the superheat of the refrigerant leaving the evaporator through the suction conduit 22. The valve 101 includes a thermostatic bulb 102 which is responsive to the temperature of the vaporized refrigerant leaving the evaporator through the suction conduit 22.

In accordance with the present embodiment, the admission of refrigerant to the evaporator is varied by adjusting the setting of the thermostatic expansion valve to maintain a different degree of superheat of the vaporized refrigerant. This may be done in any one of a number of ways, the scheme shown on the drawing being described and claimed in the application of L. G. Huggins, Serial No. 157,681, filed August 6, 1937, now Patent No. 2,279,787, dated April 14, 1942. In accordance with this scheme, the thermostatic bulb 102 is subjected to the heat generated in an electric resistance element 103 which is disposed in proximity to the thermostatic bulb. The heating element 103 is supplied with electric current from conductors 37 and 38 under control of a rheostat 104 which is actuated by the thermostat T. The rheostat 104 is adapted to decrease the resistance and increase the current supplied to the heating element as the temperature in the enclosure 10 increases. The increased heat supplied to the thermostatic bulb 102 has the same effect as an increase in temperature of the refrigerant, and thereby effects increased opening of the thermostatic expansion valve 101. The thermostatic expansion valve, therefore, maintains a lower degree of superheat, thereby effecting increased admission of refrigerant to the evaporator.

Considering the application of the embodiment as a whole, upon increase in temperature in the enclosure 10, the setting of the expansion valve is adjusted to increase the flow of refrigerant to the evaporator by maintaining a lower degree of superheat of the vaporized refrigerant. The increased admission of refrigerant increases the rate of sensible heat removal or temperature reduction of the air flowing over the evaporator. The increased admission of refrigerant tends to increase the suction pressure of the refrigerating system, but the pressure responsive element 66 responds thereto in the same manner as described above in connection with Fig. 1, by loading additional cylinders so as to remove refrigerant vapor at the increased rate necessary to maintain the same suction pressure.

Upon decrease in temperature the operation will be exactly the reverse as will be apparent.

Upon increase in humidity in the enclosure 10, the humidostat H adjusts the potentiometer control 64 to maintain a lower suction pressure for effecting a greater degree of dehumidification. The reduction in evaporator temperature also effects a greater degree of sensible heat removal, which may result in the action of the thermostat T to reduce the admission of refrigerant to the evaporator.

Upon decrease in humidity, the suction pressure is increased as will be apparent.

From the above description, it will be seen that in each embodiment the rate of sensible heat removal is controlled in response to the temperature of the air in the enclosure and the degree of dehumidification is controlled in response to the humidity of the air in the enclosure. In this way, both the temperature and the humidity are maintained at desired values. It will be apparent that the rate of sensible heat removal and latent heat removal are not entirely independent and that variation in one affects the other. For example, as pointed out above, increased rate of dehumidification also increases the sensible heat removal, but this is compensated by the action of the thermostat in reducing the admission of refrigerant. Likewise, an increase in admission of refrigerant in response to increased temperature results in a greater rate of latent heat removal. The latter may result in the action of the humidostat H increasing the suction pressure. The action of the controls is such, however, as to maintain both the dry bulb temperature and the humidity substantially at the desired values, or more precisely, within relatively close predetermined limits.

While I have shown my invention in two forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In a refrigerating system, the combination of a compressor having a plurality of cylinders having pressure-operated suction valves, a condenser, and an evaporator connected in a refrigerant circuit, unloader mechanisms associated with a plurality of said cylinders respectively for loading and unloading the same during operation of the compressor, said unloader mechanisms unloading the cylinders by holding the suction valves in open position, and means for controlling said unloader mechanisms to successively load said cylinders in response to successive increases in pressure in the low pressure side of the refrigerating system and to successively unload said cylinders in the reverse order in response to successive decreases in pressure in said low pressure side to maintain said pressure substantially at a predetermined value.

2. In a refrigerating system, the combination of a compressor having a plurality of cylinders, each cylinder having a pressure operated suction valve, a condenser, and an evaporator connected in a refrigerant circuit, means for holding the suction valve of one cylinder in open position to unload the cylinder, and means operable automatically to control said unloading means to load and unload said one cylinder in response to increase and decrease, respectively, in the refrigerant pressure in the low side of the refrigerating system to maintain said pressure substantially at a predetermined value.

3. In apparatus for air conditioning an enclosure, the combination of an evaporator, a multicylinder compressor and a condenser connected in a refrigerant circuit, means for conveying air over said evaporator and into the enclosure, means responsive to the refrigerant pressure in said evaporator for loading and unloading one or more cylinders of said compressor to maintain said pressure at a controlled value, and means responsive to increase and decrease in the humidity of the air in the enclosure for adjusting the last-mentioned means to decrease and increase, respectively, said controlled value.

4. In apparatus for air conditioning an enclosure, the combination of an evaporator, a multicylinder compressor and a condenser connected in a refrigerant circuit, means for conveying air over said evaporator and into the enclosure, means responsive to the temperature of the air in the enclosure for varying the rate at which sensible heat is removed by the evaporator from air flowing thereover, means responsive to the refrigerant pressure in said evaporator for loading and unloading one or more cylinders of said compressor to maintain said pressure at a controlled value, and means responsive to increase and decrease in the humidity of the air in the enclosure for adjusting the last-mentioned means to decrease and increase, respectively, said controlled value.

5. In apparatus for air conditioning an enclosure, the combination of an evaporator, a multicylinder compressor and a condenser connected in a refrigerant circuit, means for conveying air over said evaporator and into the enclosure, means responsive to increase and decrease in the temperature of the air in the enclosure for increasing and decreasing, respectively, the rate at which refrigerant is admitted to the evaporator, means responsive to the refrigerant pressure in said evaporator for loading and unloading one or more cylinders of said compressor to maintain said pressure at a controlled value, and means responsive to increase and decrease in the humidity of the air in the enclosure for adjusting the last-mentioned means to decrease and increase, respectively, said controlled value.

6. In apparatus for air conditioning an enclosure, the combination of an evaporator, a multi-cylinder compressor and a condenser connected in a refrigerant circuit, means for effecting flow of a stream of air into the enclosure, means for causing a variable portion of said air stream to by-pass said evaporator and the remainder to pass over said evaporator, means responsive to increase and decrease in the temperature of the air in the enclosure for decreasing and increasing, respectively, the quantity of air by-passing the evaporator, means responsive to the refrigerant pressure in said evaporator for loading and unloading one or more cylinders of said compressor to maintain said pressure at a controlled value, and means responsive to increase and decrease in the humidity of the air in the enclosure for adjusting the last-mentioned means to decrease and increase, respectively, said controlled value.

7. In apparatus for air conditioning an enclosure, the combination of an evaporator, a multi-cylinder compressor and a condenser connected in a refrigerant circuit, means for conveying air over said evaporator and into the enclosure, means responsive to the temperature of the air in the enclosure for varying the rate at which sensible heat is removed by the evaporator from air flowing thereover, a plurality of unloader mechanisms associated respectively with a plurality of the cylinders of the compressor, and means responsive to increase in humidity of air in the enclosure for controlling said unloader mechanisms to successively load the associated cylinders and responsive to decrease in said humidity for controlling the unloader mechanisms to successively unload the associated cylinders.

8. In apparatus for air conditioning an enclosure, the combination of an evaporator, a multi-cylinder compressor and a condenser connected in a refrigerant circuit, means for conveying air over said evaporator and into the enclosure, means responsive to the temperature of the air in the enclosure for varying the rate at which sensible heat is removed by the evaporator from air flowing thereover, an unloader mechanism adapted to effect complete unloading of a number of cylinders of the compressor less than the total number, and means for controlling said unloader mechanism to load the associated cylinder or cylinders automatically in response to increase in the humidity of the air in the enclosure and vice versa.

9. In apparatus for air conditioning an enclosure, the combination of an evaporator, a compressor and a condenser connected in a refrigerant circuit, means for conveying air over said evaporator and into the enclosure, means responsive to the temperature of the air in the enclosure for varying the rate at which sensible heat is removed by the evaporator from air flowing thereover, means responsive to the refrigerant pressure in said evaporator for loading and unloading said compressor to maintain said pressure at a controlled value, and means responsive to increase and decrease in the humidity of the air in the enclosure for adjusting the last-mentioned means to decrease and increase, respectively, said controlled value.

10. In apparatus for air conditioning an enclosure, the combination of an evaporator, a compressor and a condenser connected in a refrigerant circuit, means for conveying air over said evaporator and into the enclosure, means responsive to the refrigerant pressure in said evaporator for controlling the compressor to maintain said pressure at a controlled value, and means responsive to increase and decrease in the humidity of the air in the enclosure for adjusting the last-mentioned means to decrease and increase, respectively, said controlled value.

11. In apparatus for air conditioning an enclosure, the combination of an evaporator, a compressor and a condenser connected in a refrigerant circuit, means for effecting flow of a stream of air into the enclosure, said evaporator being arranged in the path of at least a portion of said air stream, means responsive to the refrigerant pressure in the evaporator for controlling the compressor to maintain said pressure at a controlled value, means responsive to increase and decrease in humidity of the air in the enclosure for adjusting the last-mentioned means to decrease and increase, respectively, said controlled value, and means responsive to increase and decrease in the temperature of the air in the enclosure for increasing and decreasing, respectively, the portion of the air stream flowing in heat transfer relation to liquid refrigerant in the evaporator, said last-mentioned means controlling said portion of the air stream substantially independently of the refrigerant pressure in the evaporator.

12. In combination, a compressor having a plurality of cylinders, a motor for driving the compressor, a controller adapted successively to energize said motor and load a cylinder of the compressor upon movement in load-increasing direction and successively to unload a cylinder of the compressor and deenergize the compressor upon movement in load-decreasing direction, means operable automatically in response to a load condition of the compressor for actuating said controller, and manually-actuated means adapted to control the actuating means, independently of said condition, to move said controller to the limit of its travel in load-decreasing direction so as to terminate operation of the compressor.

13. In a refrigerating system, the combination of a compressor having a plurality of cylinders, a condenser, and an evaporator connected in a refrigerant circuit, a controller adapted successively to initiate operation of the compressor with one or more but not all cylinders loaded and to load a second cylinder upon movement in load-increasing direction and successively to unload said second cylinder and to terminate operation of the compressor upon movement in load-decreasing direction, and an automatically controlled potentiometer control for actuating said controller.

14. In a fluid compressor apparatus including a first compressing element, a second compressing element connected in parallel fluid flow arrangement with said first element, driving means for said elements, fluid supply means and a suction valve for controlling the communication between said fluid supply means and said first compressing element, the combination of a pressure-responsive element subjected to the pressure of said fluid supply means, and means under the control of said pressure-responsive element for maintaining said valve in opened position responsive to decrease in the fluid pressure in said supply means below a predetermined point.

15. In combination, a plurality of compressor elements, feed means for supplying fluid to be compressed to said elements in parallel fluid flow arrangement, means arranged in parallel fluid flow arrangement for receiving compressed fluid from said elements, inlet valve means controlling communication between said feed means and at least one of said compressor elements, and means responsive to decrease of the pressure in said feed means below a predetermined point for maintaining said valve means in continuously opened position, said last-mentioned means including a pressure-responsive element subject to the pressure prevailing in said feed means, and valve actuating means under the control of said control element.

EDWARD R. WOLFERT.

Disclaimer 2,296,822.—*Edward R. Wolfert*, Springfield, Mass. AIR CONDITIONING APPARATUS. Patent dated Sept. 22, 1942. Disclaimer filed Feb. 16, 1951, by the assignee, *Westinghouse Electric Corporation*.

Hereby enters this disclaimer to claims 1, 2, 14, and 15 of said patent.
[*Official Gazette March 27, 1951.*]